United States Patent [19]
Uchino et al.

[11] Patent Number: 5,512,173
[45] Date of Patent: Apr. 30, 1996

[54] DEMINERALIZATION APPARATUS AND CLOTH FOR PACKING DILUTING CHAMBER OF THE DEMINERALIZATION APPARATUS

[75] Inventors: Hajime Uchino, Yokohama; Motohiko Tajima, Sagamihara; Hiroshi Horie, Funabashi, all of Japan

[73] Assignees: Nippon Rensui Co.; Nitivy Co., Ltd., both of Tokyo, Japan

[21] Appl. No.: 229,299

[22] Filed: Apr. 18, 1994

[30] Foreign Application Priority Data

Apr. 21, 1993 [JP] Japan ................... 5-116581

[51] Int. Cl.$^6$ .................... B01D 61/44
[52] U.S. Cl. .................... 204/632; 210/266; 210/269; 210/502.1; 210/503; 210/505; 210/507; 210/508; 210/243; 204/634; 428/224; 428/225; 428/233
[58] Field of Search .................... 210/243, 748, 210/266, 670, 269, 679, 502.1, 503, 505, 507, 508, 686; 204/149, 151, 182.4, 301; 428/225, 240, 280, 287, 224, 233, 265, 267, 288

[56] References Cited

U.S. PATENT DOCUMENTS

| | | | |
|---|---|---|---|
| 2,794,777 | 6/1957 | Pearson | 204/151 |
| 2,933,460 | 4/1960 | Richter et al. | 260/2.1 |
| 3,055,729 | 9/1962 | Richter et al. | 204/182.4 |
| 3,074,863 | 1/1963 | Jasionowski | 204/151 |
| 3,207,487 | 9/1963 | Ranson | 259/36 |
| 3,291,713 | 12/1966 | Parsi | 204/182.4 |
| 3,784,460 | 1/1974 | LeBras et al. | 204/301 |
| 3,972,840 | 8/1976 | Suzuki et al. | 260/2.1 R |

(List continued on next page.)

FOREIGN PATENT DOCUMENTS

| | | |
|---|---|---|
| 0170895 | of 1985 | European Pat. Off. . |
| 2292504 | of 1974 | France . |
| 1307410 | of 1989 | Japan . |
| 3224688 | of 1991 | Japan . |
| 4250882 | of 1992 | Japan . |
| 471642 | of 1992 | Japan . |
| 0503651 | of 1992 | Japan . |
| 858137 | of 1958 | United Kingdom . |
| 880344 | of 1959 | United Kingdom . |
| 1013307 | of 1963 | United Kingdom . |
| 2086954 | of 1981 | United Kingdom . |

OTHER PUBLICATIONS

Patent Abstracts of Japan Publication No. JP1317512 dated Dec. 22, 1989.
Patent Abstracts of Japan Publication No. JP63012315 dated Jan. 19, 1988.
International Search Report dated Nov. 10, 1994.
Patent Abstracts of Japan Publication No. JP62079851 dated Apr. 13, 1987.
Patent Abstracts of Japan Publication No. JP 3118813 dated May 21, 1991.

*Primary Examiner*—Cynthia L. Nessler
*Attorney, Agent, or Firm*—McAulay Fisher Nisser Goldberg & Kiel

[57] ABSTRACT

The invention is a demineralization apparatus comprising an anode chamber disposed at one end of a vessel having an anode at the inside of the anode chamber. A cathode chamber is disposed at the other end of the vessel, having a cathode at the inside of the cathode chamber. At lease one diluting chamber and at least one concentrating chamber are located alternately between the anode chamber and the cathode chamber. The diluting chamber has an anion exchange membrane on the anode chamber side and a cation exchange membrane on the cathode chamber side. The diluting chamber has an inlet for water to be treated and an outlet for demineralized water. The concentrating chamber has an inlet for water and an outlet for ion-concentrated water. The diluting chamber contains a cloth comprising a mixture of strongly acidic cation exchange fibers, strongly basic anion exchange fibers and ionically inactive synthetic fibers. Preferably, the mixture contains from 20 to 70% by weight ionically inactive synthetic fibers.

4 Claims, 3 Drawing Sheets

U.S. PATENT DOCUMENTS

| | | | |
|---|---|---|---|
| 4,032,452 | 6/1977 | Davis | 210/243 |
| 4,033,850 | 7/1977 | Kedem et al. | 204/301 |
| 4,200,735 | 4/1980 | Sano et al. | 536/30 |
| 4,505,797 | 3/1985 | Hodgdon et al. | 204/252 |
| 4,632,745 | 12/1986 | Giuffrida et al. | 204/301 |
| 4,689,134 | 8/1987 | Culkin et al. | 204/296 |
| 4,693,828 | 9/1987 | Yoshioka et al. | 210/679 |
| 4,700,722 | 10/1987 | Yoshikawa et al. | 131/334 |
| 4,808,202 | 2/1989 | Nishikawa et al. | 55/390 |
| 4,818,598 | 4/1989 | Wong | 428/284 |
| 4,871,431 | 10/1989 | Parsi | 204/182.4 |
| 4,956,071 | 9/1990 | Giuffrida et al. | 204/301 |
| 5,024,767 | 6/1991 | Kubo et al. | 210/682 |
| 5,026,465 | 6/1991 | Katz et al. | 204/182.4 |
| 5,203,976 | 4/1993 | Parsi et al. | 204/182.4 |
| 5,288,378 | 2/1994 | Chlanda | 204/182.4 |
| 5,308,467 | 5/1994 | Sugo et al. | 204/301 |
| 5,346,624 | 9/1994 | Libutti et al. | 210/679 |
| 5,354,476 | 10/1994 | Kubo et al. | 210/679 |
| 5,376,278 | 12/1994 | Salem | 210/679 |
| 5,407,728 | 4/1995 | Kerr et al. | 428/195 |
| 5,425,866 | 6/1995 | Sugo et al. | 204/301 |

DEMINERALIZATION APPARATUS AND CLOTH FOR PACKING DILUTING CHAMBER OF THE DEMINERALIZATION APPARATUS

BACKGROUND OF THE INVENTION

The present invention relates to a demineralization apparatus and a cloth for packing a diluting chamber of the demineralization apparatus. Particularly, it relates to an improvement in a demineralization apparatus utilizing electrodialysis action.

As a method of producing demineralized water, an ion exchange resin method which comprises passing water to be treated through an ion exchange resin-packed bed, regenerating a deteriorated ion exchange resin with an acid or alkali regenerant and then using the regenerated resin repeatingly has been used generally. However, the method has a drawback in that a regeneration process for the ion exchange resin by using regenerant like hydrochloric acid or caustic soda is troublesome and, in addition, a great amount of alkaline and acidic waste water is discharged. Accordingly, a process for producing demineralized water without using the regenerant has been demanded.

For such a demand, a demineralization method comprising an ion exchange resin and an ion exchange membrane in combination has been proposed in recent years. Based on the fact that water-containing ion exchange resins are good electric conductors, an electrodialysis action using anion and cation exchange membranes as diaphragms is utilized in this method. In this method, ion exchange resins as a filler are filled or packed in a diluting chamber of an electrodialysis unit defined with an anion exchange membrane and a cation exchange membrane, and water to be treated flows through the diluting chamber under application of a voltage, and the treated water is obtained as demineralized water.

During processing of this method, impurity ions in water to be treated is subjected to ion exchange by the ion exchange resin, impurity ions captured by the ion exchange resin are eluted by supply of electric current, the eluted impurity ions are separated by the ion exchange membranes. Demineralized water is produced while conducting ion exchange by the ion exchange resin and regeneration thereof simultaneously.

In this way, according to a so-called electrodemineralization method of producing demineralized water by using the ion exchange membrane and the granular ion exchange resin as the filler, it requires neither the regeneration operation for the granular ion exchange resin nor use of regenerant of acid or alkali for regeneration. Therefore, it can be considered as an advantageous method.

However, the apparatus used for the known electrodemineralization method described above has a drawback that there is a risk that the granular anion ion exchange resin and the granular cation ion exchange resin in a mixed state would separate (granular anion and cation exchange resins homogeneously dispersed and mixed are made into an inhomogeneous dispersed state due to the difference in the specific gravity between both of the resins), upon change of flow rate of water to be treated, or upon operation of discharging suspended materials accumulated in the diluting chamber out of the system. If the separation of the mixed granular ion exchange resins occurs, demineralized water of stable quality can no more be obtained.

In view of the above, there is proposed in Japanese Patent Publication (KOKOKU) No. 4-72567 (1992), a means for finely dividing a diluting chamber (deionization chamber) into a specific size to prevent the separation of the mixed granular ion exchange resins caused by fluidization of the mixed granular ion exchange resins, so that there is a disadvantage of complicating the apparatus and making the maintenance and administration troublesome.

As a result of studies made by the present inventors, it has been found that troublesome maintenance operation can be made unnecessary and demineralized water having excellent quality can be obtained stably, by using as ion exchangers in the dilution chamber, a mixture of strongly acidic cation exchange fibers, strongly basic anion exchange fibers and ionically inactive synthetic fibers in the form of cloth. This present invention has been accomplished based on the finding.

SUMMARY OF THE INVENTION

It is an object of the present invention to provide an apparatus capable of improving the quality of demineralized water and eliminating the complexity of the maintenance operation as compared with a known system in which the granular ion exchange resin is packed in the diluting chamber in the electrodemineralization apparatus described above.

In a first aspect of the present invention, there is provided a demineralization apparatus comprising:

an anode chamber disposed at one end of a vessel having an anode at the inside of the anode chamber;

a cathode chamber disposed at the other end of the vessel having a cathode at the inside of the cathode chamber; and at least one diluting chamber and at least one concentrating chamber, disposed alternately between the anode chamber and the cathode chamber, the diluting chamber having an anion exchange membrane on the anode chamber side and a cation exchange membrane on the cathode chamber side, the diluting chamber having an inlet for water to be treated and an outlet for demineralized water, the concentrating chamber having an inlet for water and an outlet for ion-concentrated water, the diluting chamber containing a cloth comprising a mixture of strongly acidic cation exchange fibers, strongly basic anion exchange fibers and ionically inactive synthetic fibers.

In a second aspect of the present invention, there is provided a cloth for packing in a diluting chamber of a demineralization apparatus, comprising a mixture of strongly acidic cation exchange fibers, strongly basic anion exchange fibers and ionically inactive synthetic fibers, the amount of the ionically inactive synthetic fibers in the mixture being 20 to 70% by weight.

DETAILED DESCRIPTION OF THE INVENTION

In the demineralization apparatus, to form at least one diluting chamber and at least one concentrating chamber, suitable numbers of the cation exchange membrane and the anion exchange membrane are disposed alternately between the anode and the cathode. A chamber defined with an anion exchange membrane disposed on the anode chamber side and a cation exchange membrane disposed on the cathode chamber side is a diluting chamber. A chamber defined with a cation exchange membrane disposed on the anode chamber side and an anion exchange membrane disposed on the cathode chamber side and disposed adjacently to the diluting chamber is the concentrating chamber.

The diluting chamber has an inlet for water to be treated and an outlet for demineralized water. The concentrating chamber has an inlet for water and an outlet for ion-concentrated water.

Preferably, the demineralization apparatus comprises at least two diluting chambers are disposed between the anode chamber and the cathode chamber, and the concentrating chamber is formed between each of the diluting chambers.

Figure 1:
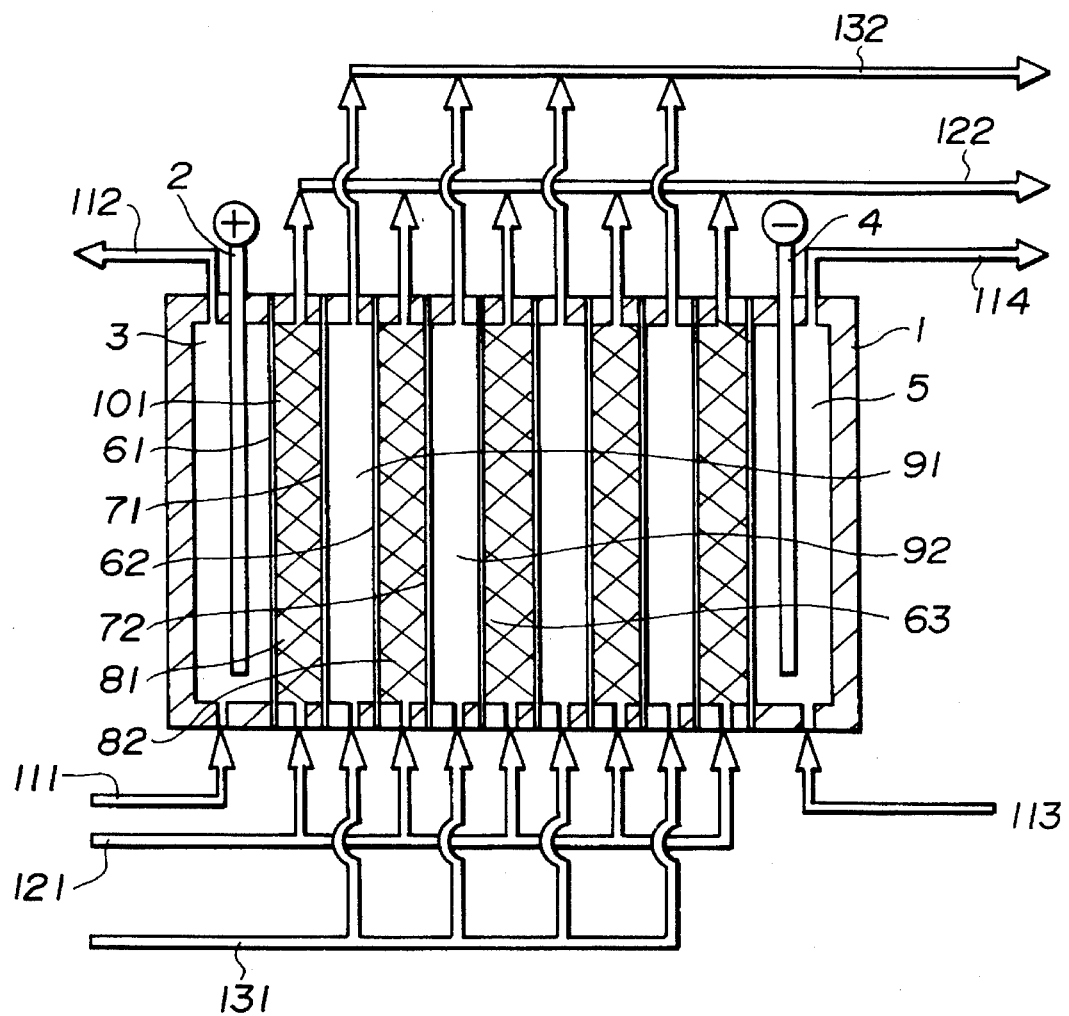
FIG. 1 is a schematic front elevational view in vertical cross section for one embodiment of the apparatus according to the present invention.

Description will be made to a preferred embodiment of the apparatus according to the present invention with reference to FIG. 1. FIG. 1 is a schematic front elevational view in vertical cross section of the apparatus, in which a vessel 1, an anode plate 2, an anode chamber 3, a cathode plate 4, a cathode chamber 5, an anion exchange membrane 61, and a cation exchange membrane 71 are shown. A diluting chamber 81 is formed between the anion exchange membrane 61 and the cation exchange membrane 71. In the same way, a second diluting chamber 82 is formed between an anion exchange membrane 62 and a cation exchange membrane 72. In this way, the anion exchange membranes and cation exchange membranes are arranged alternately to form five diluting chambers in the embodiment shown in FIG. 1. A cloth 101 comprising a mixture of strongly acidic cation exchange fibers, strongly basic anion exchange fibers and ionically inactive synthetic fibers are filled or packed in each of the five diluting chambers. Further, a chamber 91 formed between the cation exchange membrane 71 and the anion exchange membrane 62 constitute the concentrating chamber. Similarly, a chamber 92 formed between the cation exchange membrane 72 and the anion exchange membrane 63 constitute the concentrating chamber. In this way, four concentrating chambers are formed in the apparatus shown in FIG. 1.

The anode chamber 3 and the cathode chamber 5 are respectively charged with suitable electrolytic solutions so as to provide electroconductivity. Since the concentration of the electrolyte solution is gradually lowered during electric current supply, it is preferred to maintain the concentration always at a predetermined level. For this purpose, it is preferred to recycle a portion of ion-concentrated water discharged from the concentrating chambers. The electrolyte solution is introduced through an electrolyte solution entrance pipe 111 to the anode chamber 3 and discharged through an electrolyte solution exit pipe 112 therefrom. In the same manner, the electrolyte solution is introduced through an electrolyte entrance pipe 113 and discharged through an electrolyte solution exit pipe 114 as to the cathode chamber 5.

Further, water to be treated (water to be demineralized) is supplied in parallel to five diluting chambers through an entrance pipe 121 and treated water (demineralized water) is discharged from an exit pipe 122. Water (usually, the same as water to be treated) is supplied through an entrance pipe 131 to the four concentrating chambers and water of increased ionic concentration is discharged from an exit pipe 132.

When a DC current (usually at 20 to 60 mA/dm$^2$) is applied between the anode plate 2 and the cathode plate 4, impurity ions in water to be treated are removed by the anion and cation exchange fibers contained in the cloth 101 in the diluting chambers to provide demineralized water. The impurity ions captured in the ion exchange fibers are electrically dialyzed by the anion and cation exchange membranes, transferred to the concentrating chambers and then discharged as ion concentrated water from the exit pipe 132.

The ratio of the amount of water to be treated supplied to the diluting chamber and the concentrating chamber depends on the composition of water to be treated and it is treated usually within a range of 1:1 to 5:1.

The supplying conditions to the apparatus are selected depending on the water quality desired, economics and composition of the water to be treated.

For the basic structure of the demineralization apparatus according to the present invention, any of known electrodialysis units of a structure in which cation exchange membranes and anion exchange membranes are disposed alternately between electrodes of the anode and the cathode can be used with no particular restriction. For instance, a filter press-type or unit cell-type electrodialysis unit having a structure in which cation exchange membranes and anion exchange membranes are arranged alternately each by way of chamber frames between the anode and the cathode and diluting chambers and concentrating chambers are formed with both of the ion exchange membranes and the chamber frames are used.

According to the present invention, a mixture of strongly acidic cation exchange fibers and strongly basic anion exchange fibers and further ionically inactive synthetic fibers, which is in the form of cloth, is packed in a diluting chamber.

The anion and cation exchange fibers usable herein can include fibers of a polymer of polystyrenes, polyphenols, polyvinyl alcohols, polyacrylates, polyethylenes and polyamides having cation exchange groups and anion exchange groups respectively.

A typical example of the cation exchange group is sulfonic group. A typical example of the anion exchange group is trimethyl ammonium group.

The cation exchange groups on the strongly acidic cation exchange fibers have pKa of usually less than 1.0. The anion exchange groups on the strongly basic anion exchange fibers have pKb of usually more than 13.

The ion exchange fibers are commercially available.

The cation and anion ion exchange fibers may be in regenerated forms (H form and OH form) or salt forms.

As the ionically inactive synthetic fibers to be mixed with the anion and cation exchange fibers, synthetic fibers having no ion exchange groups (usually not more than 0.1 meq/g) can be used with no particular restriction otherwise. Typically, synthetic fibers made of polyester, polyolefin, polyamide or the like can be mentioned.

A form of the cloth comprising the mixture of the ion exchange fibers and the ionically inactive synthetic fibers can includes felts, non-woven fabrics, paper, knitted and braided products. Based on the weight per unit area, the cloth is evaluated.

The strongly acidic cation exchange fibers and the strongly basic anion exchange fibers are used usually at a ratio such that the ion exchange capacities are substantially equal to each other (usually 48/52–52/48, preferably 49/51–51/49), to which the ionically inactive synthetic fibers are added to form the cloth for packing the diluting chamber. If the ionically inactive synthetic fibers are used alone, since the ion exchange fibers are not present at all, demineralized water quality obtainable is as poor as that in usual electrodialysis.

On the other hand, if the ionically inactive synthetic fibers are not mixed at all, hindrance of ion transportation would occur, which is considered to be attributable to the formation of contact between the anion and cation exchange fibers to each other as explained below, failing to obtain good demineralized water quality. Therefore, an appropriate content of ionically inactive synthetic fibers is required.

The content of the ionically inactive synthetic fibers in the mixture of the anion and cation exchange fibers and ionically inactive synthetic fibers is preferably from 20 to 70% by weight and, particularly preferably from 30 to 60% by weight based on the entire weight. Within the above-mentioned range, impurities ions in water to be treated can be captured more rapidly and transported to the outside of the ion exchange membranes more rapidly.

The thickness of the cloth, while different depending on the apparent density, is usually made greater by 10 to 60% than the thickness of the diluting chamber and to such an extent as capable of close packing into the diluting chamber. The thickness of the diluting chamber is usually 1 to 5 mm. Plural of the cloth may be used with stacking.

There are no particular restriction on the diameter and the length of the strongly acidic cation exchange fibers, the strongly basic anion exchange fibers and the ionically inactive synthetic fibers so far as they can be made into cloth, but usually the diameter is from 5 to 50 μm and the aspect ratio (length/diameter) is from 100 to 250.

As has been described above, the present invention is mainly characterized by packing the cloth comprising a mixture of the anion and cation exchange fibers and ionically inactive synthetic fibers in the diluting chambers and utilizing the electrodialysis action to produce demineralized water. This is more advantageous in view of operation and, in addition, can provide demineralized water at higher purity as compared with a case of producing demineralized water under the same operational conditions while packing a mixture of granular strongly acidic ion exchange resin and strongly basic ion exchange resin in the diluting chambers.

More specifically, when the granular ion exchange resins are packed in the diluting chambers, it requires an extremely complicate operation to pack the granular ion exchange resins at a uniform thickness, in a homogeneously dispersed and mixed state of the granular cation exchange resin and the granular anion exchange resin and in a inseparable manner. On the contrary, in a case of packing the cloth as a mixture of the ion exchange fibers and the ionically inactive synthetic fibers, they can be packed in the diluting chamber by an extremely simple and convenient operation while keeping the thickness substantially uniform and with no possibility of separation between the cation exchange fibers and the anion exchange fibers to cause an inhomogeneous mixed state.

Further, in a case of the granular ion exchange resin, even during passage of water to be treated in the diluting chamber, there is a possibility of separation between the granular cation exchange resin and the granular anion exchange resin to result in an inhomogeneous dispersed and mixed state, which may lead to deterioration of the quality of demineralized water. Therefore, this makes it impossible to adopt an upward stream for the water passing direction to the diluting chamber. However, use of the cloth comprising the mixture of the ion exchange fibers and the ionically inactive synthetic fibers as in the present invention can adopt the upward stream for the water passing direction, which can prevent instability of the quality of demineralized water due to localized stream of water to be treated which tends to occur in the case of a downward stream.

Further, in the apparatus according to the present invention, demineralized water at higher purity can be obtained as compared with the case of using the granular anion and cation ion exchange resins. Although the reason is not apparent, it may be considered as below. In the case of the granular ion exchange resins, if the captured impurity ions are cations for instance, the impurity ions transport along the surface of the cation exchange resin particles adjacent to each other by the application of a voltage and transfer toward a negative potential. If the captured ions are anions, the impurity ions transport along the surface of the anion exchange resin particles adjacent with each other and transfer toward the positive potential for regeneration. However, if the cation exchange resin particle is adjacent to the anion exchange resin, ion transfer is interfered and hindered due to difference of ion exchange resins and the regenerating efficiency is worsened.

On the other hand, in a case of using the ion exchange fibers as in the apparatus according to the present invention, the impurity ions once captured transport along the surface of one cation exchange fiber and transfer toward the negative potential, if the ions are cations. The captured impurity ions, if they are anions, transport along the surface of one anion exchange fiber and transfer toward the positive potential for regeneration. Different from the case of using the granular ion exchange resins, since the ion exchange fiber is continuous as a single fiber, the regenerating efficiency is higher and demineralized water at higher purity can be obtained.

Since the ion exchange fibers comprise single continuous fibers, ions can easily transport on the surface. However, if a cation exchange fiber and an anion exchange fiber are in contact to each other to have a point of contact, transfer of the cations and anions is hindered at the point of contact. Then, the ionically inactive synthetic fibers are mixed to reduce the point of contacts between the anion and cation exchange fibers to each other, so that the ions transfer more rapidly, to further improve the regenerating efficiency and provide demineralized water at higher purity. In addition, incorporation of the ionically inactive synthetic fibers can reinforce the strength of the entire cloth.

EXAMPLES

Description will be made to examples of producing demineralized water using the apparatus according to the present invention.

Example 1

Demineralized water was produced while variously changing the ratio of the ionically inactive synthetic fibers in a mixture comprising the strongly acidic cation exchange fibers, the strongly basic anion exchange fibers and the ionically inactive synthetic fibers in the cloth to be packed in the diluting chamber.

As the strongly acidic cation exchange fibers, fibers prepared by dispersing homogeneously a sulfonic compound of styrene and divinylbenzene into matrix of polyvinyl alcohol and dry spinning (IEF-SC (trade name), NITIVI Co., Ltd.) was used. As the strongly basic anion exchange fibers, fibers prepared by adding polymethyl ammonium groups to a main skeleton of polyvinyl alcohol (IEF-SA (trade name), NITIVI Co., Ltd. ) was used. Both of the ion exchange fibers are mixed each in an identical ion exchange capacity, to which polyester fibers were added at various ratios as the ionically inactive synthetic fibers into a mixed state and then fabricated into a nonwoven fabric for use.

The apparatus used had a structure as shown in FIG. 1 except that the apparatus comprised three diluting chambers and two concentrating chambers.

Each of the diluting chambers was 390 mm in length, 130 mm in width and 1 mm in thickness, in which the nonwaven fabric (cloth) were contained (10 g/camber). Each of the concentrating chambers was 390 mm in length, 130 mm in width and 2 mm in thickness, in which nothing was packed.

The anion exchange membrane used was SELEMION® AMD (Asahi Glass Co., Ltd.) having 390 mm in length and 130 mm in width. The cation exchange membrane used was SELEMION® CMD (Asahi Glass Co., Ltd.) having 390 mm in length and 130 mm in width.

Water to be treated in this case was prepared by dissolving a mixture of 20% by weight of sodium chloride and 80% by weight of sodium hydrogen carbonate into purified water, and contained salts of 10 ppm as calcium carbonate. The salt-containing water was passed through at a flow rate of 20 l/hr through the diluting chambers and both of the electrode chambers. Salt-containing water of an identical composition was also passed at the same flow rate to the concentrating chambers.

Figure 2:
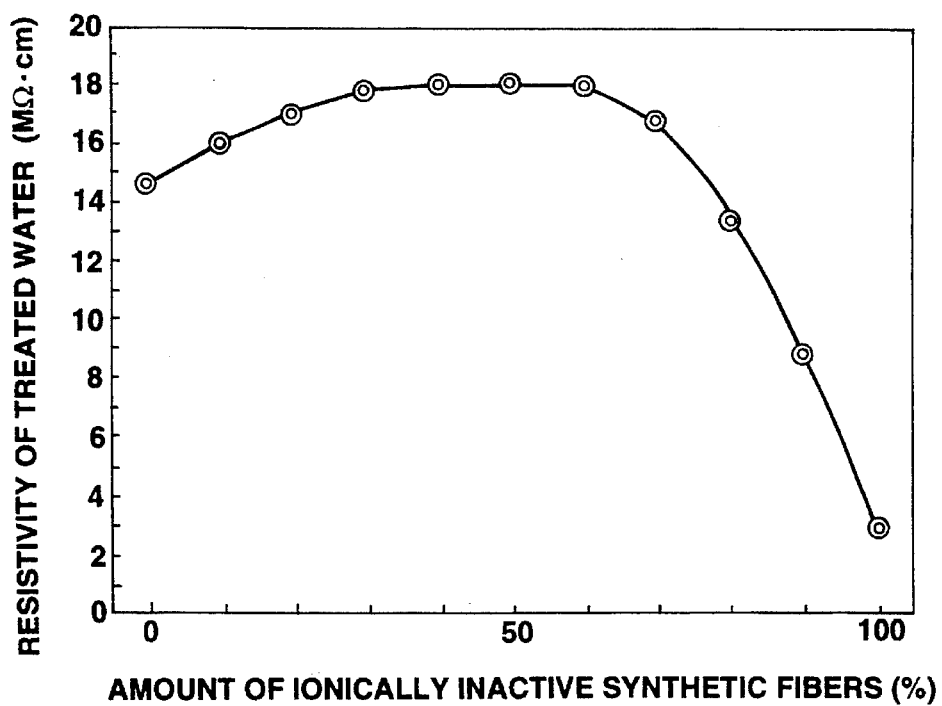
FIG. 2 is a graph showing a relation between change of an amount of the ionically inactive synthetic fibers and change of resistivity of the resultant treated water in Example 1.

At the same time with the water passage, a DC current kept at 200 mA was applied through the electrode plates in both of the electrodes chambers and the electroconductivity of treated water from the diluting chambers was measured. Results are shown in FIG. 2. The graph shows the resistivity of treated water (reciprocal of the electroconductivity) (on the ordinate) while changing the ratio of the ionically inactive synthetic fibers in the cloth packed in the diluting chamber (on the abscissa). It can be seen from the results that the mixing ratio of the ionically inactive synthetic fibers is preferably within a range from 20 to 70% by weight and, particularly preferably, within a range from 30 to 60% by weight.

Example 2

Figure 3:
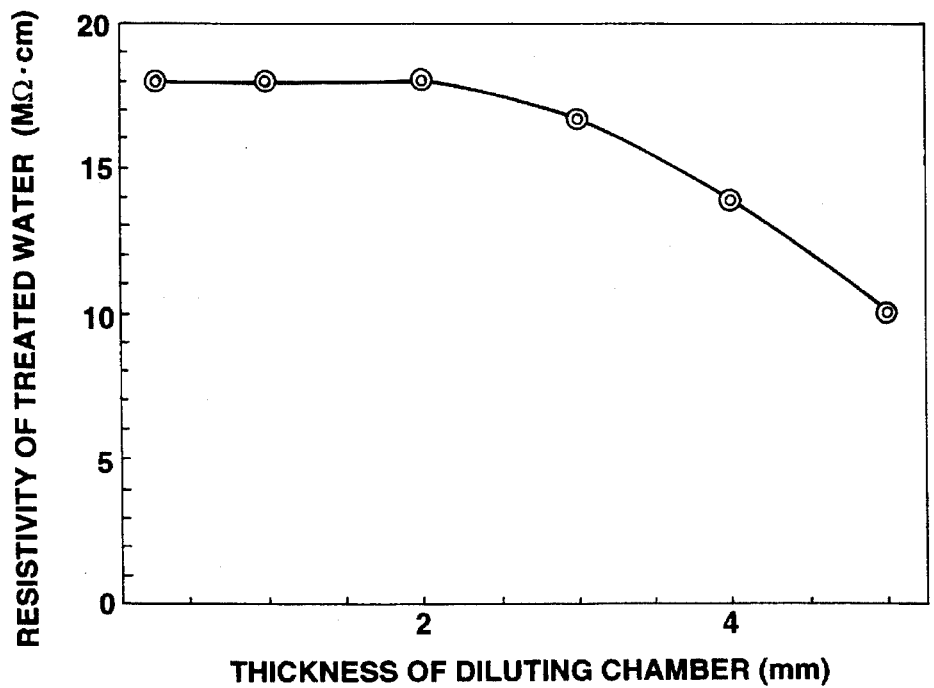
FIG. 3 is a graph showing a relation between change of a thickness of a diluting chamber and change of resistivity of the resultant treated water in Example 2.

A water passage test was carried out by using the same demineralization apparatus as in Example 1, except for changing the thickness of the diluting chamber within a range from 0.3 to 5 mm. Conditions were identical with those in Example 1 except that the content of the ionically inactive synthetic fibers in the cloth was at 50% by weight. The results are shown in FIG. 3. As can be seen from the results, lowering of the resistivity of treated water was observed when the thickness of the diluting chamber exceeded 2 mm.

Example 3 and Comparative Examples 1 and 2

Water passage test was carried out using the same demineralization apparatus as that in Example 1. In the comparative examples, water treatment was conducted under the same conditions except for packing the granular ion exchange resins instead of the cloth in the diluting chamber. Namely, in Comparative Example 1, a granular strongly acidic cation ion exchange resin (DIAION® PK112, Mitsubishi Kasei Corporation) and a granular strongly basic anion ion exchange resin (DIAION® SA10A, Mitsubishi Kasei Corporation) (I type) mixed each in an equivalent amount were packed (35 g/chamber). In Comparative Example 2, a granular strongly acidic cation ion exchange resin (DIAION® PK112, Mitsubishi Kasei Corporation) and a granular strongly basic anion ion exchange resin (DIAION® SA20A, Mitsubishi Kasei Corporation) (II type) mixed each in an equivalent amount were packed (35 g/chamber). On the other hand, in the example of the present invention, the cloth as described in Example 1 (ionically inactive synthetic fiber content of 50% by weight) were packed in the diluting chamber.

Figure 4:
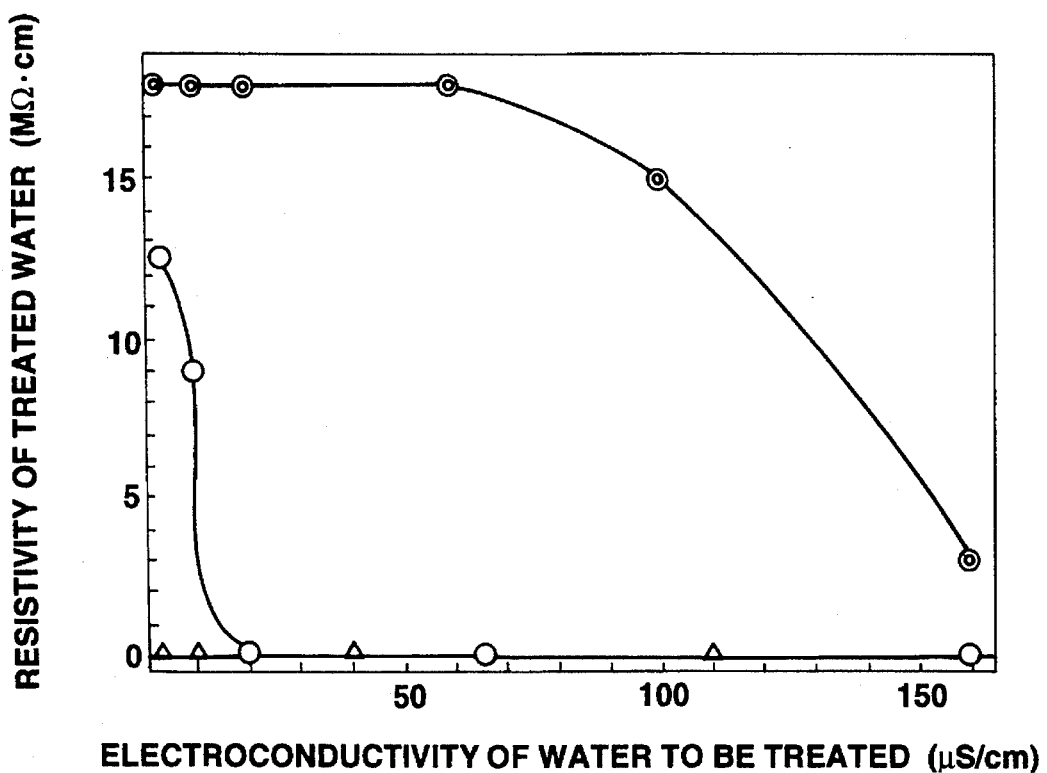
FIG. 4 is a graph showing a relation between change of electroconductivity of water to be treated and change of resistivity of the resultant treated water in Example 3 and Comparative examples 1 and 2.

Using water to be treated of different electroconductivity (μS/cm) as shown in FIG. 4 (on the abscissa) and treated under the same conditions as those in Example 1, to measure the resistivity of the treated water. The results are shown in FIG. 4. In the figure, a curve obtained by plotting double circles shows Example 3, a curve obtained by plotting trigonal marks shows Comparative Example 1 and a curve obtained by plotting a single circle shows Comparative Example 2. As is clear from FIG. 4, as compared with Comparative Examples 1 and 2 in which the granular ion exchange resins were packed in the diluting chambers, the example of the present invention in which the cloth comprising a mixture of the ion exchange fibers and the ionically inactive synthetic fibers can provide treated water of higher resistivity, that is, higher purity even in a case where the electroconductivity is rather high and ionic amount is rather great in the treated water.

Example 4

A water to be treated passage test was carried out by using the same demineralization apparatus as that in Example 1. The content of the ionically inactive fibers in the cloth was 50% by weight. The conditions adopted were identical with those in Example 1 except for using two types of water passing directions, that is, using upward stream for the water passing directions both in the diluting chambers and the concentrating chambers (In FIG. 1, water is passed from the entrance tube 121 for water to be treated to the diluting chambers in the direction of arrows and water is passed from the entrance tube 131 to the concentrating chambers in the direction of arrows, in which the water passing direction was made identical. This is referred to as first water passing case.) and using downward stream, contrary to the case of the first water passing to the diluting chamber and passing water in the upward stream in the same manner as in the first water passing to the concentrating chambers (referred to as second water passing case).

The resistivity of the resulted treated water was measured and the results are shown in Table 1.

TABLE 1

|  | Diluting chamber | Concentrating chamber | Resistivity of treated water (MΩ.cm) |
| --- | --- | --- | --- |
| First water passing case | Upward stream | Upward stream | 18.2 |
| Second water | Downward | Upward | 18.2 |

TABLE 1-continued

| | Diluting chamber | Concentrating chamber | Resistivity of treated water (MΩ.cm) |
|---|---|---|---|
| passing case | stream | stream | |

That is, there was no difference in the resistivity of the treated water between the case where water was passed in the upward stream and the downward stream to the diluting chambers and treated water at high purity could be obtained.

What is claimed is:

1. A demineralization apparatus comprising:
   an anode chamber disposed at one end of a vessel having an anode at the inside of the anode chamber;
   a cathode chamber disposed at the other end of the vessel having a cathode at the inside of the cathode chamber; and
   at least one diluting chamber and at least one concentrating chamber, disposed alternatively between the anode chamber and the cathode chamber,
   the diluting chamber having an anion exchange membrane on the anode chamber side and a cation exchange membrane on the cathode chamber side,
   the diluting chamber having an inlet for water to be treated and an outlet for demineralized water,
   the concentrating chamber having an inlet for water and an outlet for ion-concentrated water,
   the diluting chamber containing a cloth comprising a mixture of strongly acidic cation exchange fibers, strongly basic anion exchange fibers and ionically inactive synthetic fibers, the ionically inactive synthetic fibers in the mixture being present in an amount of from 20 to 70% by weight.

2. A demineralization apparatus according to claim 1, wherein:
   at least two diluting chambers are disposed between the anode chamber and the cathode chamber, an anion exchange membrane is disposed on the anode chamber side of each of the diluting chamber, a cation exchange membrane is disposed on the cathode chamber side of each of the diluting chamber, and
   the concentrating chamber is defined between each of the diluting chambers.

3. A demineralization apparatus according to claim 1, wherein amounts of the strongly acidic cation exchange fibers and strongly basic anion exchange fibers are substantially equal based on ion exchange capacity.

4. A demineralization apparatus according to claim 1, wherein each of the anode chamber and the cathode chamber has an inlet and an outlet for an electrolyte solution.

* * * * *